Sept. 6, 1949.  B. DE HAVEN MILLER  2,481,436
PROCESSING OF STARCH PASTES
Filed June 3, 1946

TO MIX TANKS AND
CONTINUOUS EMULSIFIER
FOR FINISHED SALAD DRESSING

INVENTOR
Bruce De Haven Miller
BY
ATTORNEYS

Patented Sept. 6, 1949

2,481,436

UNITED STATES PATENT OFFICE 2,481,436

PROCESSING OF STARCH PASTES

Bruce De Haven Miller, Louisville, Ky., assignor to The Girdler Corporation, Louisville, Ky., a corporation of Delaware Application June 3, 1946, Serial No. 674,017

5 Claims. (Cl. 127—32)

In commercial use today there are a number of starches, such as wheat, corn, tapioca, potato starch, arrowroot and waxy maize, the first four being the more important ones. These find large use in the dry state, as for baking powder. They also find use in so-called pastes for salad dressing (mayonnaises and the like), for textile purposes, for coating, for adhesives, for brewing pastes, and for other purposes. Such pastes usually are formed by mixing one or more starches with one or more other substances such as, for example, water, acid, gums, egg yolk, seasoning, enzymes, and clay, depending upon the particular use. Again depending upon the particular use, in some cases all of the ingredients are initially mixed, while in other cases only some of the ingredients are initially mixed and the others are added in some later stage of the processing. These mixtures are generally termed "pastes," despite the fact that amylose, per se, one of the principal constituents of starch, is soluble in water.

The invention has to do with the processing of these so-called pastes, and its nature, objects and advantages will be best understood from the following brief description of the conventional procedure followed.

In general, most of these pastes are cooked and subsequently cooled. Following the cooling there may be one or more operational steps, again depending on the particular end product or end use. The cooking temperature to be employed will of course vary not only with the particular field of use but also with the particular product in such field; and, moreover, with desired variations in the particular product, as will further appear. The primary purpose of the heating is to bring about such changes, chemical and/or physical, in the character of the starch as may be needed for the particular product.

In conventional commercial practice, the cooking and the cooling are done in batch-wise fashion either in one or more vessels, of relatively large volume. Batch-wise operation requires a very substantial period of time for the cooking and the cooling, sometimes totalling one to two hours and sometimes longer. Hence, because of poor heat transfer and the viscosity of the pastes, the material is subjected to cooking heat not only during the cooking but also during much of the cooling. Stated in another way, cooking heat persists during cooling for a substantial period of time and thus the changes which are determinative of the essential character of the end product, are brought about in the two stages of cooking and cooling. Broadly considered, that alone presents difficulties in the matter of control, and therefore in the securing of uniformity of product from batch to batch. This control difficulty is, in the case of salad dressing, aggravated because it is the conventional practice to preheat the water considerably above starch cooking temperature and then mix it with the starch to bring the starch to the desired cooking temperature (usually 185° F.). Then follows the cooking for about 10 to 15 minutes, followed by holding and cooling for about one hour or more. Further complication arises by reason of other variables encountered in commercial operation. Again using salad dressing by way of illustration: some desire a relatively stiff product, others desire a relatively runny product, all generally desire a product which will not separate or synerize; and the starches, as well as other ingredients of the formulation may differ, and the proportions thereof may vary. The temperature to be employed, to secure a given end product, varies with such factors as these, what is suitable for one set of conditions being unsuitable for another.

In view of considerations such as the foregoing, it will be apparent that extreme nicety and flexibility of control would be an important desideratum. While, theoretically, it might be possible to obtain such control in batch-wise operation, from a commercial standpoint, it is impossible or impractical to do this, and, in consequence, there is frequently non-uniformity as between batches.

By my invention I provide a continuous method of extreme nicety and flexibility of control and which, therefore, readily lends itself to the processing of the various pastes referred to, securing, in each case, a consistently uniform stable product of superior quality. Moreover, as will further appear, the method, in contrast with conventional practice, is an extremely rapid one and the amount of material in residence in the processing system at any given time, is small. This has the advantage, inter alia, that one may quickly and conveniently test for the conditions most suitable for any given product. The importance of this will be appreciated when, for example, there is a change in formulation. Upon such a change, it is not usually possible to predict with any certainty the particular cooking temperature which will give the best results. By my process this can be quickly ascertained by test, and with a relatively small quantity of material. Other advantages will be set forth hereinafter.

One form of apparatus suitable for practicing the process is illustrated in the accompanying drawings, wherein—

Figure 1:
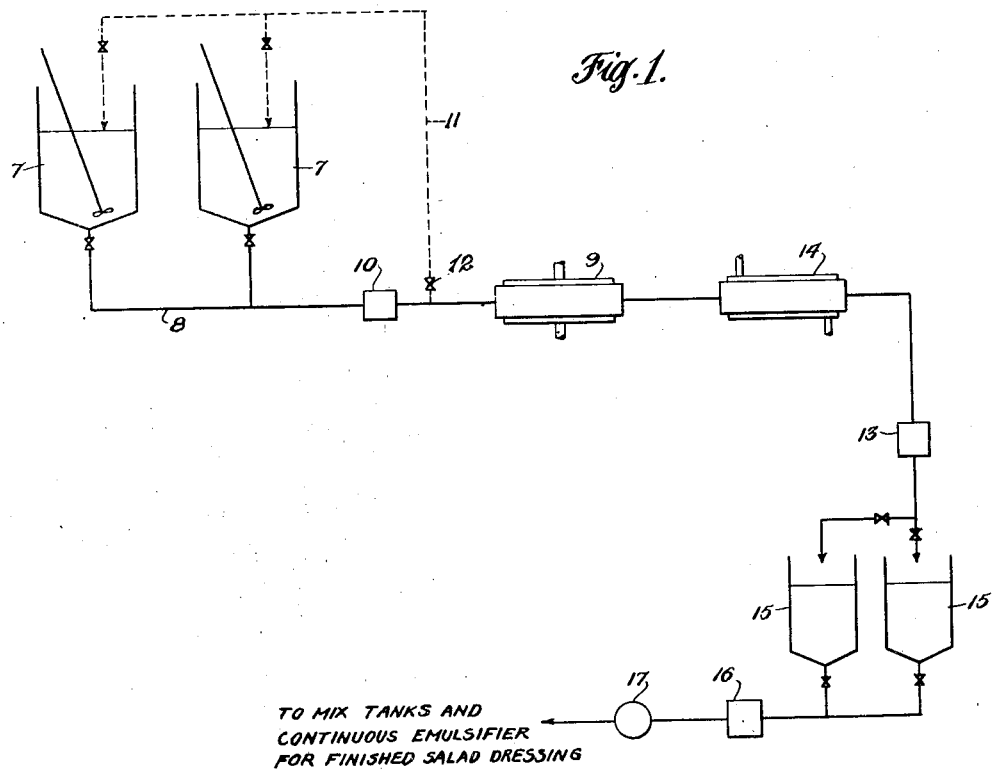
Figure 1 is a diagram illustrating the general arrangement of parts.

The method and apparatus will be described in the processing of salad dressing, by way of illustration, reference being first had to Figure 1. The ingredients of the salad dressing, with the possible exception of the oil and egg yolk, which are usually added at a later stage, are introduced into slurry tanks 7 of which there are preferably two or more, to afford a source of continuous supply to the remainder of the equipment. Of course one may continuously feed the ingredients in the desired proportions to a single slurry tank and continuously feed from such tank. In the slurry tanks, the ingredients are mixed at a temperature ranging from about room temperature to about 130° F. Feed line 8 connects the slurry tanks with the cooking vessel 9, to be later described. Located in the line 8 is a pump 10 which preferably is a large capacity centrifugal pump, capable of delivering a greater quantity of slurry than it is desired to pass through the cooker 9. The excess delivery of the pump may be circulated back to the slurry tanks by way of the line 11, which may be equipped with a shut-off valve 12. This type of pump is desirable as the slurry, at this stage, but not in later stages, is somewhat abrasive in character. By using this type of pump the wear is greatly minimized. Ordinarily the pressure is just about that required to move the material through the cooker and cooler, say roughly 30 lbs. per sq. in. gauge.

The cooker 9 is jacketed and is indirectly heated as by means of steam controllably admitted and discharged respectively through the inlet and the outlet shown, which may be located at convenient points. Slurry continuously passes through the heater in the form of a thin confined layer, as will be later described in more detail, and, while passing through the heater, all portions of the slurry within the heater are concurrently heated and violently agitated and thoroughly mixed, in a manner such that all of the particles are uniformly and very rapidly brought to temperature. By reason of this, local overheating, scorching or burning is avoided and the material discharges from the cooker in a uniformly consistent condition.

For salad dressing, the material is heated in the cooker, to a temperature preferably within the range of from about 188° F. to 196° F., depending upon the particular characteristics desired, with a residence time in the cooker of approximately from 10 seconds to approximately 15 seconds. It will be seen that this is an extremely rapid rate of heating. If, as is usually the case, the slurry enters the cooker at room temperature, say 70° F. to 90° F., this represents a minimum increase of roughly 100° F. in 10 to 15 seconds. The general characteristics of the heating curve obtained are a sharp, steep rise followed by a tailing off or flattening. Heretofore, it has been regarded as impossible to adequately cook in such a short period. It was thought necessary to hold the paste at cooking temperature for a substantial period of time.

The temperature of the cooker can be readily controlled within + or −1° F. by means of conventional automatic temperature responsive controllers (not shown). This is highly desirable as the temperature for any given product should be very closely maintained to secure satisfactory and uniform results. Furthermore, it will be seen that the constancy of temperature conditions in the cooker is unaffected by the time and character of additions to the slurry tank, whereas in the batch process the additions immediately and variably alter the cooking conditions.

On leaving the cooker, the material is discharged into the cooler 14, which desirably is of the same construction as the cooker. In this case, however, the water, brine or other cooling medium, is controllably introduced at the far end and discharged at the near end so as to produce a counterflow of cooling medium with reference to the material moving through the cooler. (Where ammonia or the like is used for the cooling medium, counterflow is unimportant.) More specifically, in the case of salad dressing the material enters the cooler at approximately 188° F. to 196° F., and is cooled in from about 10 to about 15 seconds of residence in the cooler (if the cooler is of somewhat larger diameter and smaller clearances than the cooker), to approximately 80° F., a minimum drop of roughly 110° F., or at an average rate of roughly 10° F. per second. However, the initial portion of the cooling curve immediately drops almost vertically downward for a substantial distance, and then begins to flatten out, so that cooling to below cooking temperature occurs in about one second. Thus, as stated, the desired changes needed for the particular end product are determined essentially in the cooker. By reason of the foregoing, the method lends itself to extreme nicety and flexibility of control through control of the heating medium and the cooling medium, in consequence of which uniformity of the product leaving the cooler is consistently obtained. With this process, it will be seen that operating conditions can be readily determined and maintained constant. Moreover, since, in the cooler, there desirably is the same violent mixing concurrently with the cooling as occurs in the cooker during the heating, all particles are uniformly brought down to temperature and the material leaving the cooler is of uniform consistency and character. Thus, the product leaving the cooler is not only uniform in character, but also of superior quality as contrasted with the product produced by conventional methods.

Because of the rapid uniform heating, the concurrent violent mixing, and the effecting of the desired changes in the heater, I am enabled safely to exceed the cooking temperature ordinarily employed for salad dressing (usually about 185° F.) and to decrease the residence time to a matter essentially of seconds.

Ordinarily, I process about 1000 lbs. to about 2500 lbs. of starch per hour through the cooker and cooler. Roughly about 15 to about 60 lbs. of material are in residence at any given time when the cooker and the cooler are of essentially the same diameter and clearances. From this it will be seen, as hereinbefore indicated, that what is the best cooking temperature for any given formulation and the sensitivity of the formulation to cooking and cooling, can be quickly and readily determined and evaluated with a relatively small quantity of material. By my process, the gamut of cookings and coolings and samplings required for determining the best conditions for any given new product or formulation can usually be run in a matter of minutes, as against a matter of days by conventional practice.

In practically all cases, a gelling period is required for the salad dressing paste and hence the material discharged from the cooler is led to one or more holding or gelling tanks 15. For this purpose a metering pump or similar device 13 may be located either in the line leading from the cooler to the gel tanks or in the line between the cooker and the cooler. In either case, it acts as a booster pump affecting the pressure in the system, in addition to acting as a meter. From the gelling tanks, the material is pumped, as by pump 16 through a meter 17, to the emulsifying tank or tanks where the vegetable oil and egg yolk are added and the material emulsified and then packaged.

In conventional practice, where gelation is required the overall time for cooling and gelation, particularly in the case of starch pastes for salad dressing, varies widely, in many cases from overnight to as much as twenty-four hours. When the paste is processed in accordance with my invention, however, the cooling may be accomplished in a matter of seconds as previously described, and generally no more than about 30 minutes, and frequently less, is required for gelation, so that the overall time for cooling and gelation is in the order of one-half hour or less. Hence, although I do not know to what the improved result is attributable, I have definitely ascertained that wherever a holding period for gelation is required, the overall time for cooling and gelation with my improved process is but a small fraction of what is ordinarily employed in conventional practice.

I also find that when salad dressing paste is processed in accordance with the described method, the effect of bacteria is greatly minimized. Despite the relatively short residence period in the cooker, I have found that comparatively very little difficulty is encountered from fermentation due to bacteria. This may, at least in part, be attributable to the fact that in the cooker and the cooler, where violent agitation and mixing occur, the system is closed. In the holding tanks there is no agitation or mixing, and the agitation required in the slurry tanks is not of such a character as introduces large quantities of air. Whatever small amount of air which may be introduced into the mixture in the slurry tanks, is also brought to temperature in the cooker. It may also in part be attributed to the fact that in the operation of my process, the apparatus is essentially self-cleaning, i. e., there are no "hang ups" of material in the equipment, as is frequently the case in conventional practice. Such hang-up material may well be a source of trouble from bacteria. (Also because of hang-ups, which break loose from time to time, it is necessary in the batch processing of some pastes, as, for instance, textile pastes, to pump the processed paste through filters. This is unnecessary in my process.)

The process has the following additional advantage. In conventional practice, it is not uncommon to heat directly by the introduction of steam. An inevitable consequence of this is the introduction into the material of some boiler water which effects a variable alteration in the composition as to water content and carries in, along with it, variable quantities of chemical used in the purification of boiler water. This results very frequently in "off flavor" taste. Again, in conventional practice, it is not infrequent that some of the material is lost by evaporation, as, for example, some of the vinegar which is quite volatile. This also results in "off flavor" taste and changes the composition which also affects the end product. This is entirely avoided in my process in which nothing is added to or taken away from the initial paste mixture.

Figure 2:
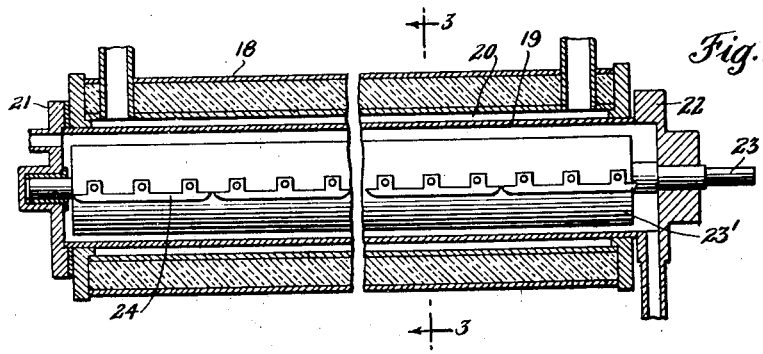
Figure 2 is a longitudinal section through the cooking vessel.
Figure 3:
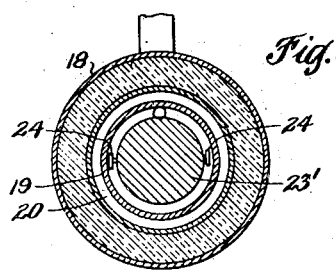
Figure 3 is a cross section taken on the line 3—3 of Figure 2.

Referring now to Figures 2 and 3, the construction of a preferred form of cooker will be described. The insulated jacket 18 surrounds a heat transfer tube 19 in such a manner to provide a space 20 for the heating medium. The tube 19 preferably has a very thin wall, say, for example, an eighth inch wall, approximately four feet long, in the size of the cooker shown in the drawing. The tube is provided with end members 21 and 22 in which the shaft 23 is mounted and driven by any desired driving means not shown. That portion of the shaft 23' lying within the tube 19 is enlarged in diameter, the tube 19 having an internal diameter of four inches and the enlarged portion of the shaft having a diameter of $3\frac{1}{2}''$. This leaves an annular space of a quarter inch between the tube and the shaft. The paste to be heated enters at the left hand end and travels in a thin annular layer through such space and discharges from the right hand end. The shaft is provided with two or more rows of closely spaced scrapers 24, and, as will appear, the shaft is rapidly rotated. In consequence, the films forming on the surface of the heat transfer tube are removed practically as rapidly as formed and are violently agitated and mixed with the remainder of the paste in the annular layer, in consequence of which all portions of the paste in the cooker are substantially uniformly brought to temperature without danger of overheating, scorching, or burning. Moreover, the paste leaves the heater in completely dispersed form and of uniform consistency. In the cooker, the starch is also gelatinized.

The shaft is rotated ordinarily from about 250 R. P. M. to 600 R. P. M. or more. With this type of apparatus it is possible to obtain a high overall coefficient of heat transfer and hence an exceedingly rapid rate of heat transfer or temperature change. In fact, it is possible to obtain with this type of apparatus, an average rate of heat transfer or temperature change of 10° F. or more per second and also a high overall coefficient of heat transfer. I have found that an average rate of heat transfer or temperature change of 1° F. per second or more, with an overall heat transfer coefficient of about 200 B. t. u. per (hr.) (ft.$^2$) (°F.) or more, will be generally satisfactory, depending upon the particular end product desired.

The cooler preferably is of a form and construction similar to that of the cooker, as illustrated in Figs. 2 and 3, the cooling medium being controllably admitted and the pre-determined temperature being maintained in a manner similar to that previously described in connection with the cooker. The cooler also is operated at high speed, usually from 200 to 600 R. P. M. or more, and by it I secure the extremely high average rate of cooling hereinbefore described, with the initial cooling to substantially below cooking temperature being very abrupt, in consequence of which, for all practical purposes, continuance of change in the character of the paste due to heat is practically instantaneously arrested. With the cooler, as with the cooker, I have found that an average rate of heat transfer or temperature change of 1° F. per second or more, with an overall heat transfer coefficient of about 200

B. t. u. per (hr.) (ft.²) (°F.) or more, will be generally satisfactory. I prefer, however, to operate at a rate much higher than 1° F. per second.

The processing of starch pastes in accordance with my present invention is not limited to the particular form and details of construction of the apparatus herein described and illustrated, since, although such apparatus is preferred, there may be employed any other suitable apparatus or combination of apparatus having the required operational characteristics and capable of functioning to accomplish results such as are herein set forth as being essential in the practice of my invention. For example, apparatus such as disclosed in my copending application, Serial No. 502,272 filed September 14, 1943, now Patent 2,448,042 also may be employed advantageously in the cooking stage of my improved process, especially in those cases where relatively fluid pastes are involved. Moreover, as will be evident from the detailed description herein contained, my invention is not limited in all respects to the complete overall process herein disclosed, since certain features of the invention reside in important and highly beneficial improvements in some of the individual steps of the disclosed process.

By way of illustration of the pronounced benefits obtainable with my process, as compared to a typical efficiently operated batch process, a salad dressing paste of the same formulation was treated by each process, in accordance with the following procedure and with the following results:

provided the heat transfer surface of the cooler is somewhat larger than that of the cooker, because the overall coefficient of heat transfer obtainable from liquid to liquid, as is largely the case in the cooker, is intrinsically greater than can be had from paste to liquid, as is the case in the cooler. If the cooker and cooler are of the same diameter and clearances, the residence time in the cooler is from about 20 seconds to about 30 seconds. This result may be obtained, for example, by making the cooler slightly longer than the cooker. If the cooler is made somewhat larger in diameter than the cooker and with smaller clearances, the residence period may be the same in both cooker and cooler. In some instances a total residence time in the cooker and the cooler of substantially 10 seconds gives satisfactory results. In other instances a residence time of from substantially 10 seconds to substantially 30 seconds in each of the two zones gives satisfactory results.

I claim:

1. The process of preparing starch pastes which comprises mixing starch with water to form a slurry, continuously feeding the slurry in a thin confined layer, under positive pressure endwise to and through an elongated heating zone having a heat transfer wall, gelatinizing the slurry in said zone by supplementarily agitating and indirectly heating the slurry through said wall, continuously discharging the resultant paste from the heating zone and continuously feeding the paste in a thin confined layer under positive pressure endwise to and through an elongated cooling zone

|   | Process Herein Described | Batch Process (100 gallon) |
|---|---|---|
| 1. Start | Slurry of starch and other ingredients at room temperature (about 70° F.). | Water only. |
| 2. Cook | Pump continuously and heat to approximately 190° F. in about 10 seconds. R. P. M.=300–600; U¹=250–600 B. t. u./(hr.) (° F.) (ft.²) ° F./sec.=12 (approx.). | Heat water to about 20° F. above desired paste temperature, then add starch and other ingredients and hold about 15 minutes at about 185° F. R. P. M. =150; U¹=100 B. t. u./(hr.) (° F.) (ft.²) ° F./sec.=0.1 (approx.). |
| 3. Cool | Continuously to approximately 80° F. in about 20 seconds. R. P. M.=200–600; U¹=200–400 B. t. u./(hr.) (° F.) (ft.²) ° F./sec.= 6 (approx.). | Cool to about 130°–150° F. in about 20–30 minutes. R. P. M.= 150; U¹=40 (approx.) ° F./sec.=0.04 (approx.). |
| 4. Gel | Allowed to gel for about 30 minutes. Pumped into and out of gel tank continuously, and thence to continuous emulsifier. | Put in 30–50-lb. containers to allow to set overnight. Transferred by hand to batch emulsifier. |
| 5. Product | Uniformly consistent. Photomicrographic examination shows starch particles uniformly treated. | Varying in batch and from batch to batch. Starch particles non-uniformly treated. |

¹ U=overall coefficient of heat transfer.

My improved process may be employed to advantage not only for the processing of starch pastes for salad dressings, but also starch pastes for printing gums, warp sizing, and backfill for textile purposes; for beater starch, tub sizing and clay coatings for paper work; and for brewing pastes, adhesives and other starch-containing products. In these various fields of use, the cooking temperatures will vary as hereinbefore pointed out. In fact in some cases, it is conventional practice to operate close to the boiling point, say at about 210° F. By my process I am enabled to go somewhat above the boiling point since the cooker and cooler operate under pressure, which pressure may be increased somewhat above that required to move the material through the cooker and cooler. The pressure in the cooker may readily be such as to maintain liquid volatiles in liquid form. In all cases the residence time is very short and may almost be regarded as a matter of seconds. The maximum time necessary in any case is about a total of 3 minutes residence in the cooker and cooler. In most instances, a residence time of from 10 to 15 seconds or even less in the cooker, is adequate. The residence time in the cooler may be the same, having a heat transfer wall, and cooling the paste in the cooling zone by supplementarily agitating and indirectly cooling the paste through said wall to a temperature below effective starch cooking temperature.

2. The process of preparing starch pastes which comprises mixing starch with water to form a slurry, continuously feeding the slurry in a thin confined layer, under positive pressure endwise to and through an elongated heating zone having a heat transfer wall, gelatinizing the slurry in said zone by supplementarily agitating and indirectly heating the slurry through said wall, continuously discharging the resultant paste from the heating zone and continuously feeding the paste to a cooling zone, and cooling the paste in the cooling zone to a temperature below effective starch cooking temperature, the cooling being effected at a rate sufficient to maintain that state of gelatinization obtained in the heating zone.

3. A process according to claim 2 in which the rate of feed through the heating and cooling zones provides a total residence time in said zones of the order of from 10 seconds to 3 minutes.

4. A process according to claim 2 in which the rate of feed through the heating and cooling zones provides a residence time in each of said zones of the order of from 10 seconds to 15 seconds.

5. The process of preparing starch pastes which comprises mixing starch with water to form a slurry, continuously feeding the slurry under positive pressure endwise to and through an elongated heating zone, gelatinizing the slurry in said zone by supplementarily agitating and indirectly heating the slurry in said zone, continuously discharging the resultant paste from the heating zone and continuously feeding the paste to a cooling zone, and cooling the paste in the cooling zone at a rate sufficient to maintain substantially that state of gelatinization obtained in the heating zone.

BRUCE DE HAVEN MILLER.

REFERENCES CITED

The following references are of record in the file of this patent:

UNITED STATES PATENTS

| Number | Name | Date |
|---|---|---|
| 1,516,512 | Stutzke | Nov. 25, 1927 |
| 1,871,027 | Bergquist | Aug. 9, 1932 |
| 1,928,891 | Hagen | Oct. 3, 1933 |
| 2,024,299 | Shaw | Dec. 17, 1935 |
| 2,148,016 | Gale | Feb. 21, 1939 |
| 2,233,243 | Burns | Feb. 25, 1941 |